No. 830,115. PATENTED SEPT. 4, 1906.
R. E. TURNER.
TYPE WRITING MACHINE.
APPLICATION FILED FEB. 23, 1905.

8 SHEETS—SHEET 2.

Robert Eugene Turner. Inventor

Witnesses
By Walter B. Burrow.
Attorney

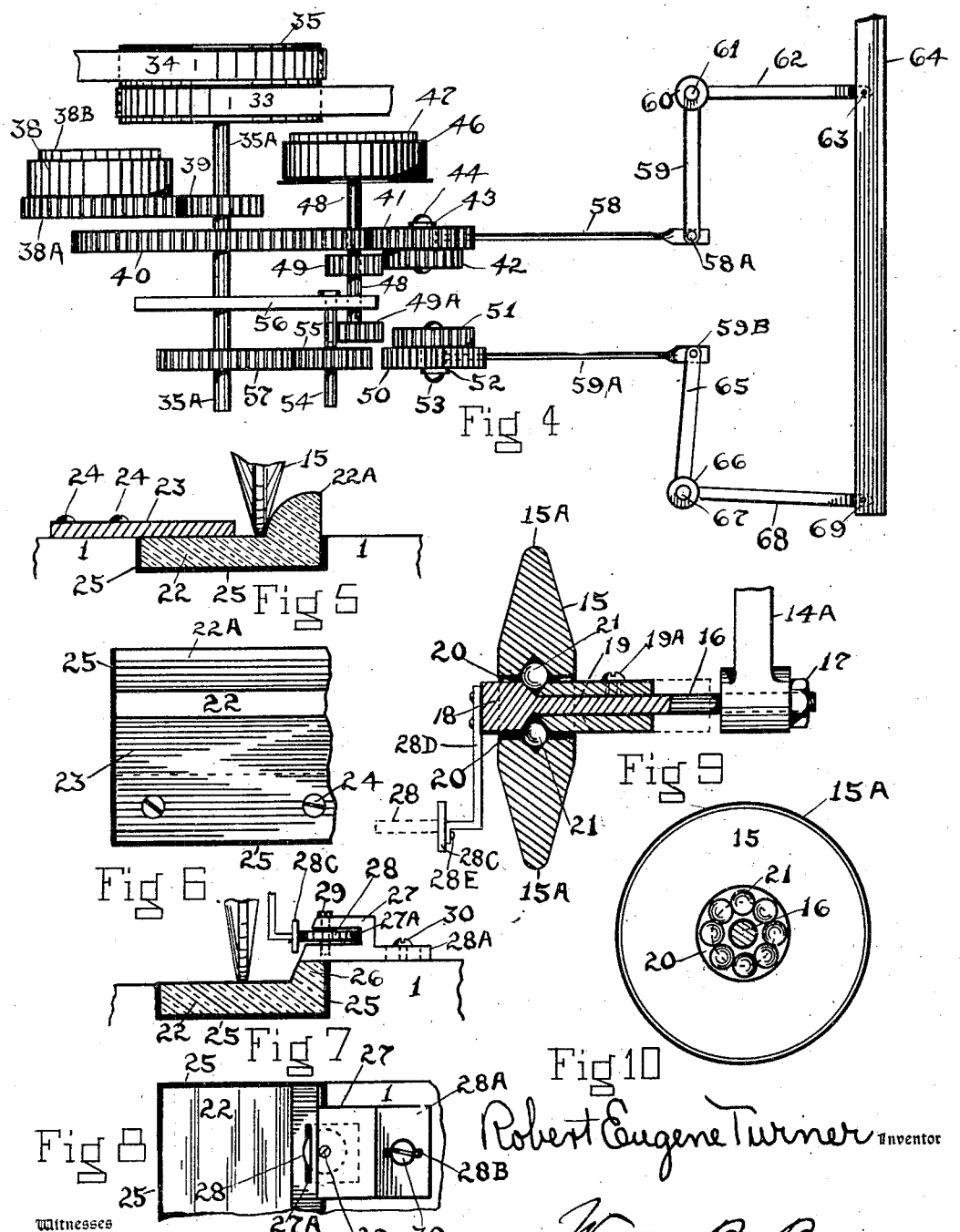

No. 830,115. PATENTED SEPT. 4, 1906.
R. E. TURNER.
TYPE WRITING MACHINE.
APPLICATION FILED FEB. 23, 1905.

8 SHEETS—SHEET 4.

Robert Eugene Turner Inventor.

Witnesses
By Walter B. Burrow
Attorney

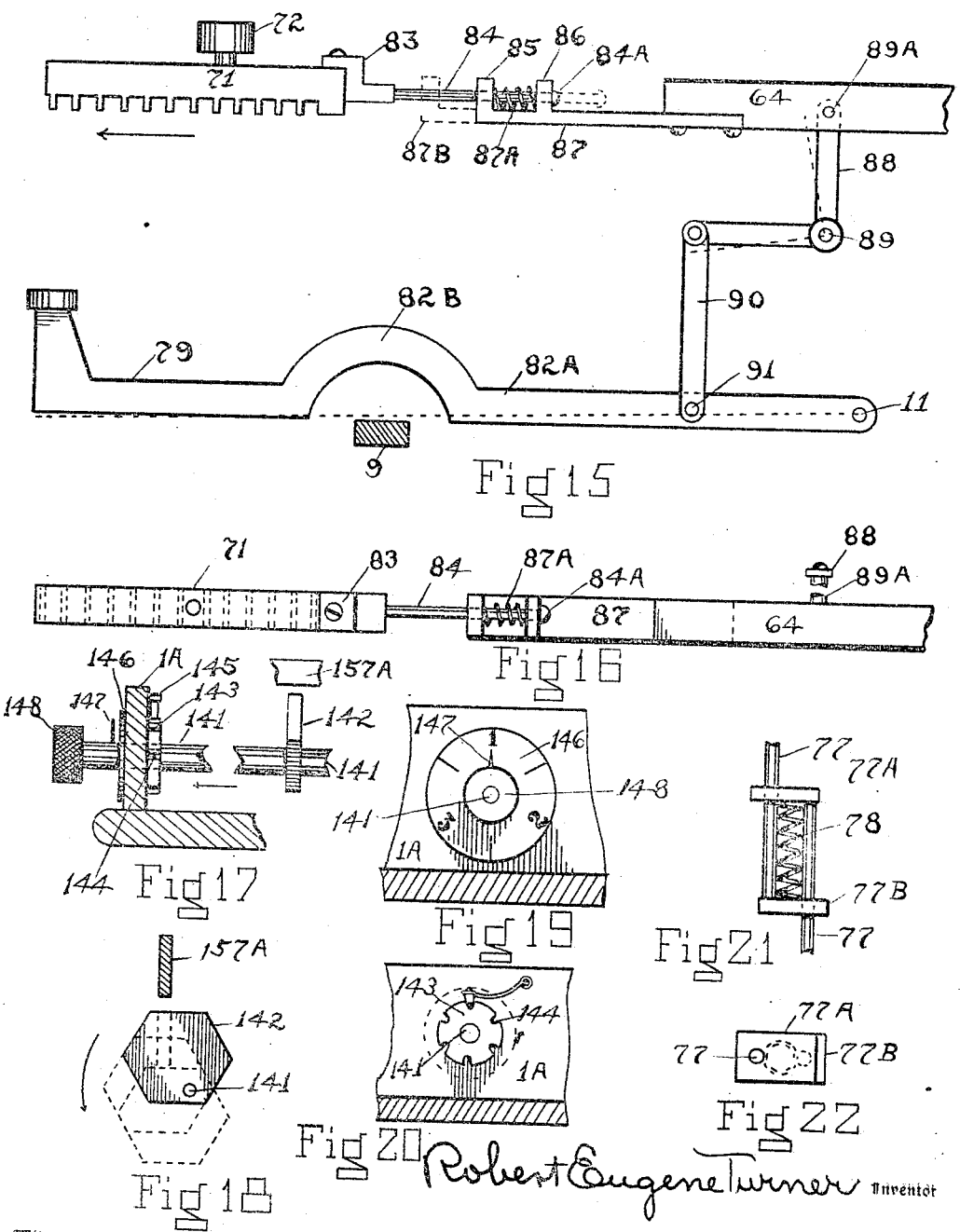

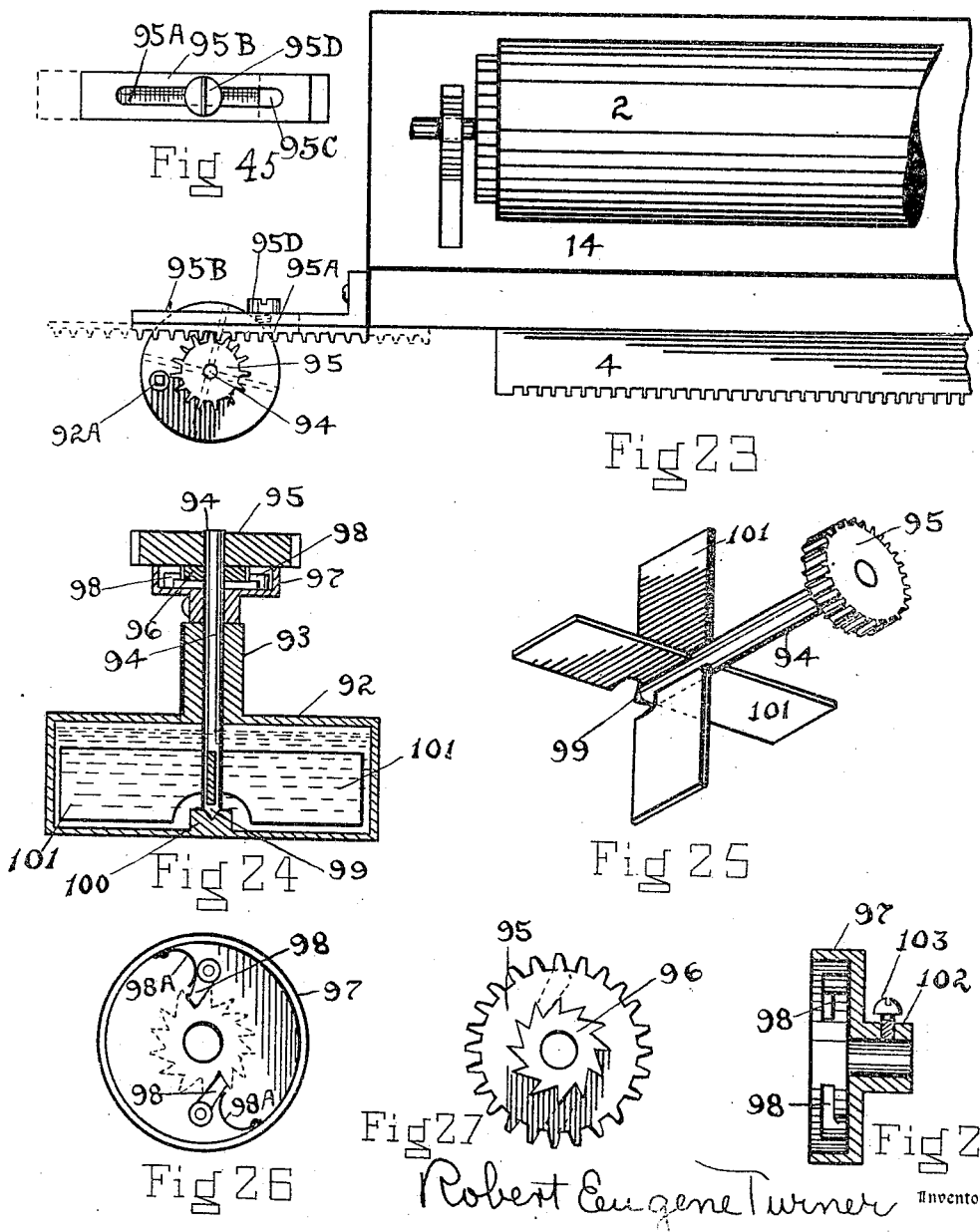

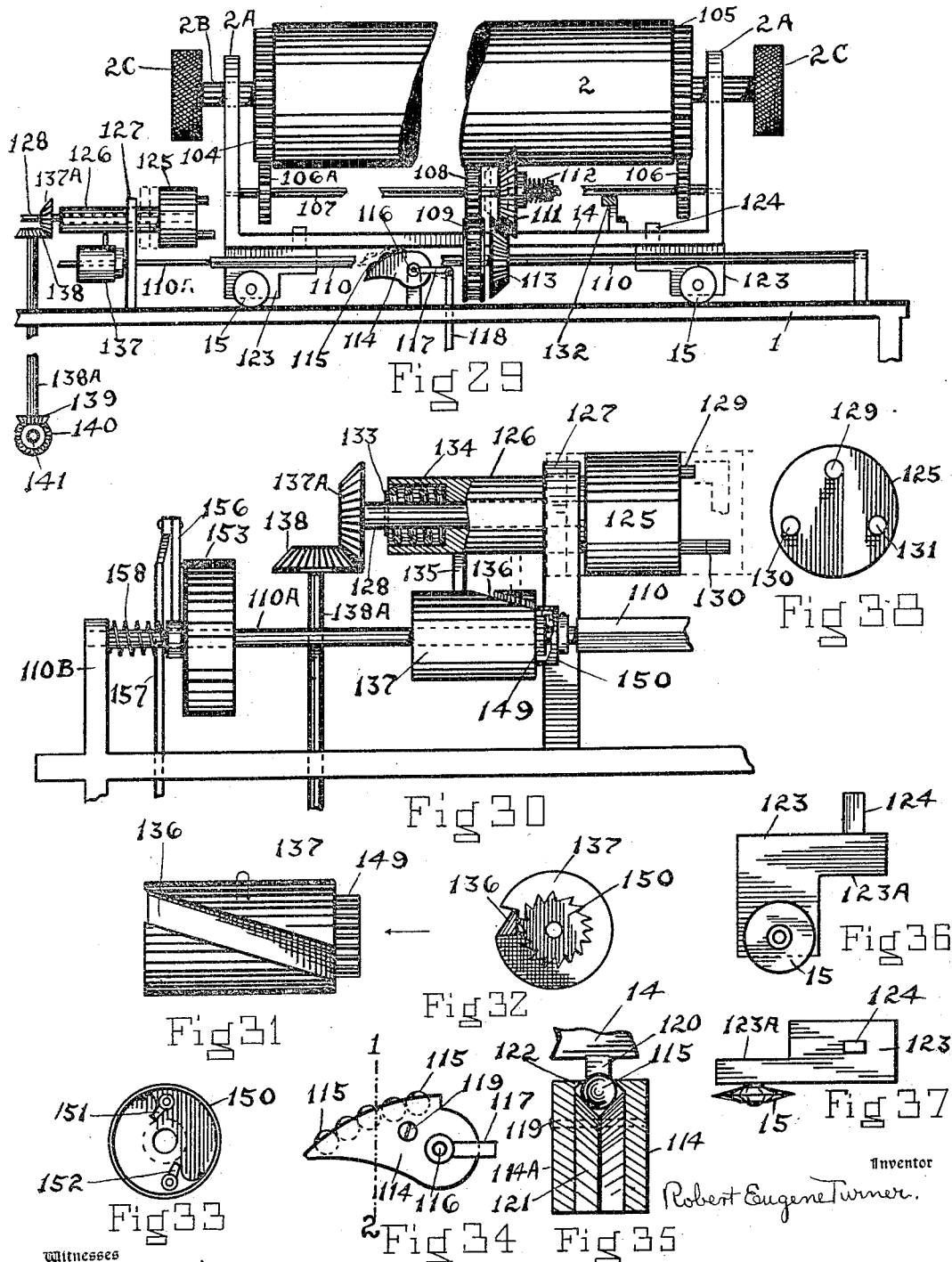

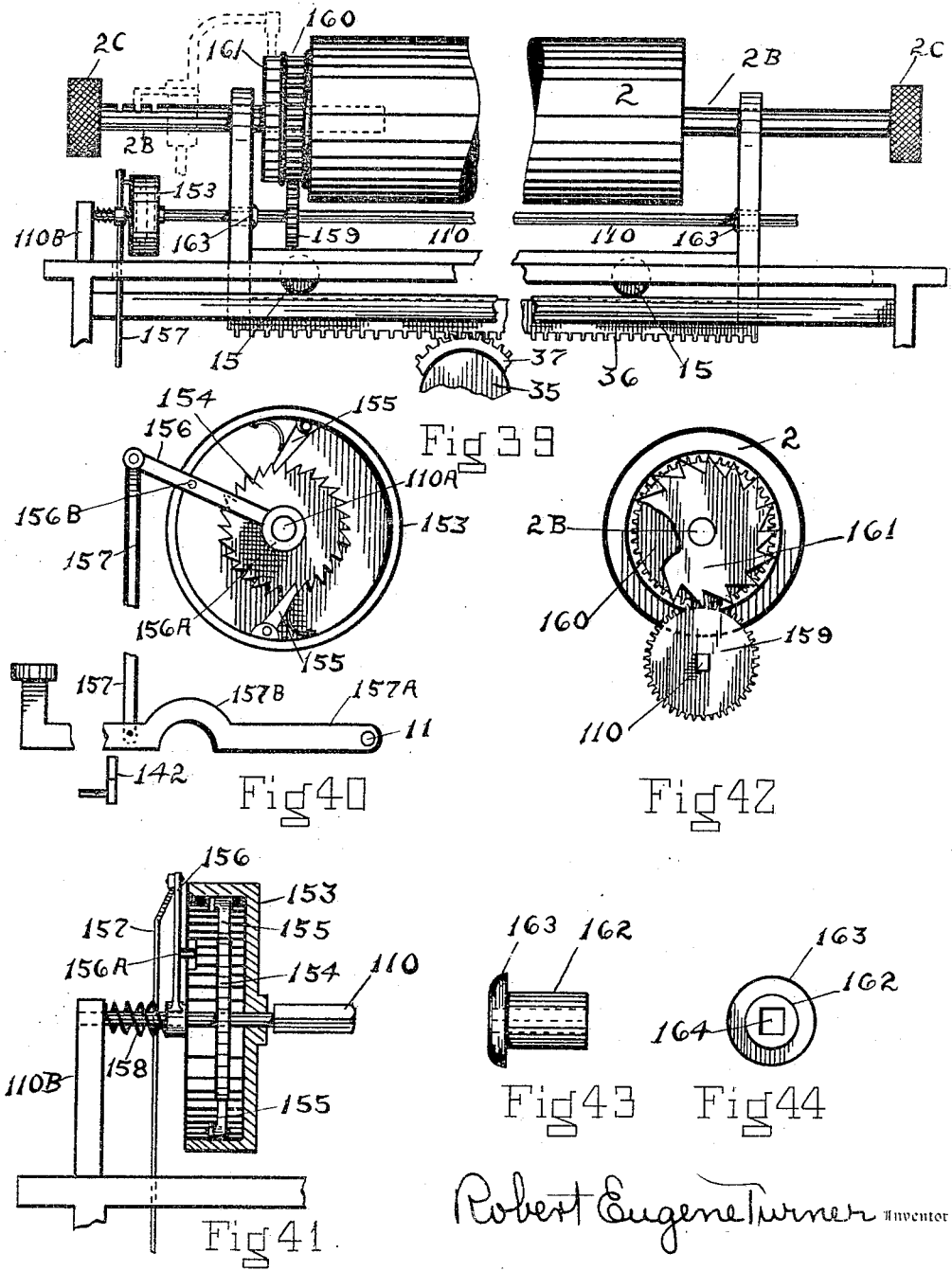

UNITED STATES PATENT OFFICE.

ROBERT EUGENE TURNER, OF NORFOLK, VIRGINIA.

TYPE-WRITING MACHINE.

No. 830,115.　　　　　Specification of Letters Patent.　　　　Patented Sept. 4, 1906.

Application filed February 23, 1905. Serial No. 246,927.

*To all whom it may concern:*

Be it known that I, ROBERT EUGENE TURNER, a citizen of the United States, residing at Norfolk, in the county of Norfolk and State of Virginia, have invented certain new and useful Improvements in Type-Writing Machines, of which the following is a specification.

My invention relates to type-writing machines and paper-carriages therefor, and one of the primary objects is to increase the mechanical control of the paper-carriage with a resultant increase in speed.

Another object of my invention is to provide certain peculiar construction of carriages which will enable it to return automatically when the end of the writing-line is reached, also to return same by pressing a key-lever on the keyboard to return the carriage at any point of its stroke and to cushion the impact thereof occasioned by the abrupt stoppage of the carriage.

A further object of my invention is to provide certain tracks or runways for the frictionless operation of the carriage.

A further object of the invention is to effect the line-spacing by manual and automatic means.

With the above and other objects in view my invention consists of certain novel improvements shown in simple embodiments in the accompanying drawings, forming a part of this specification, in which—

Figure 1:
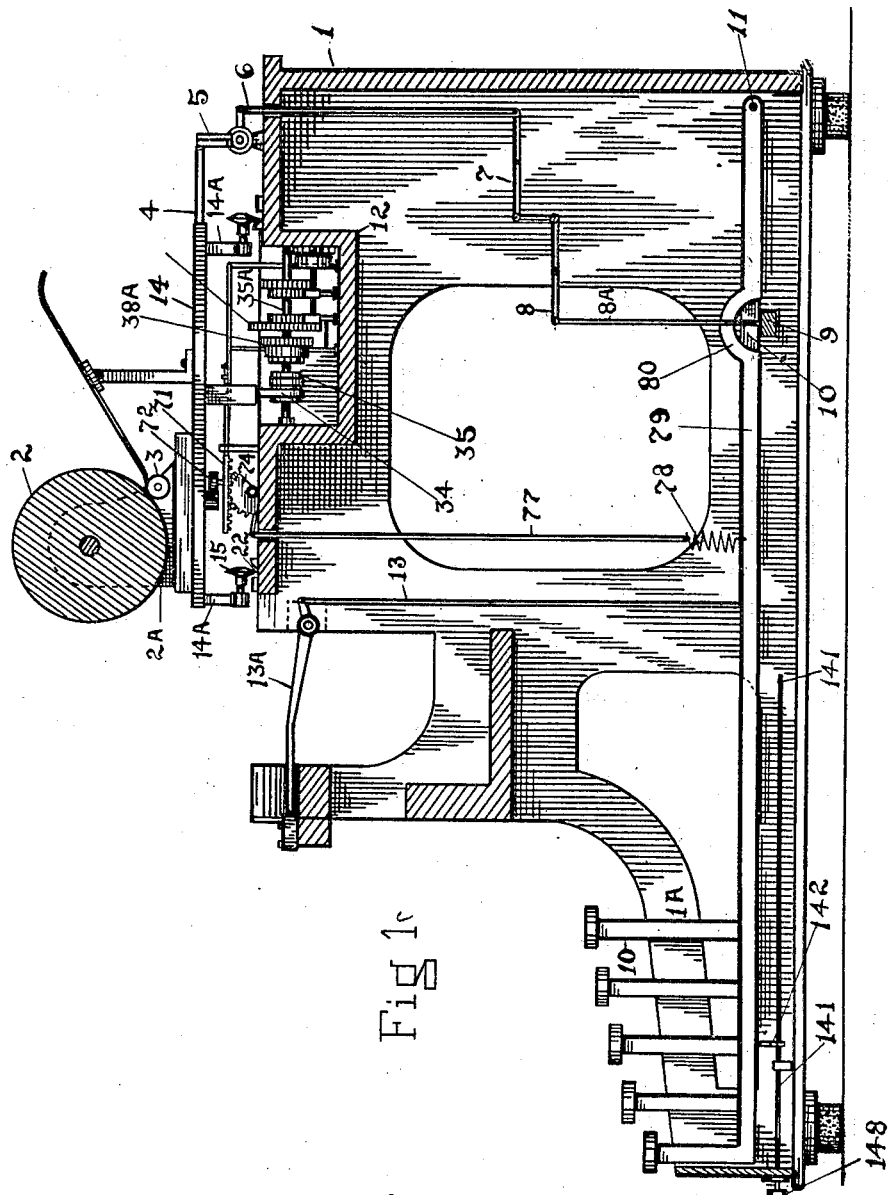
Figure 2:
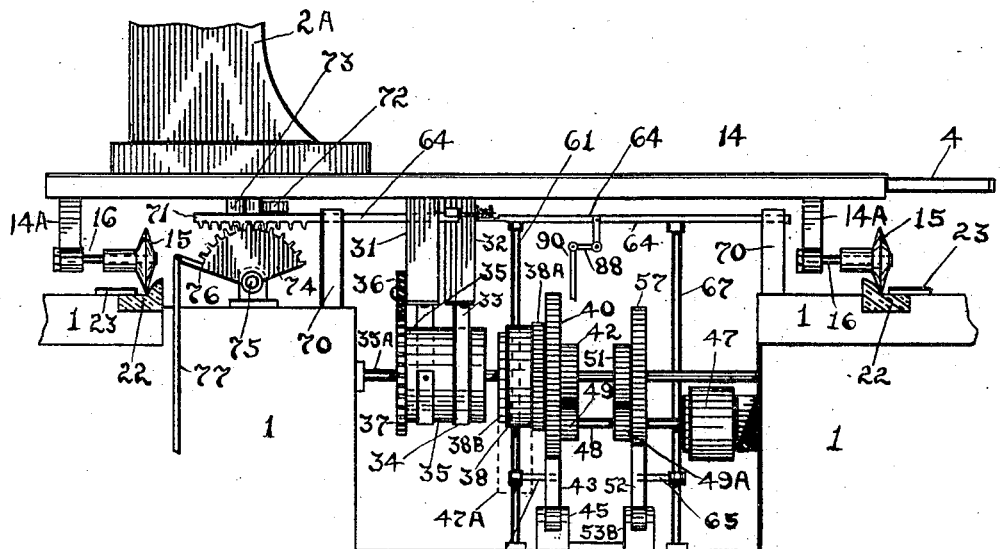
Figure 3:
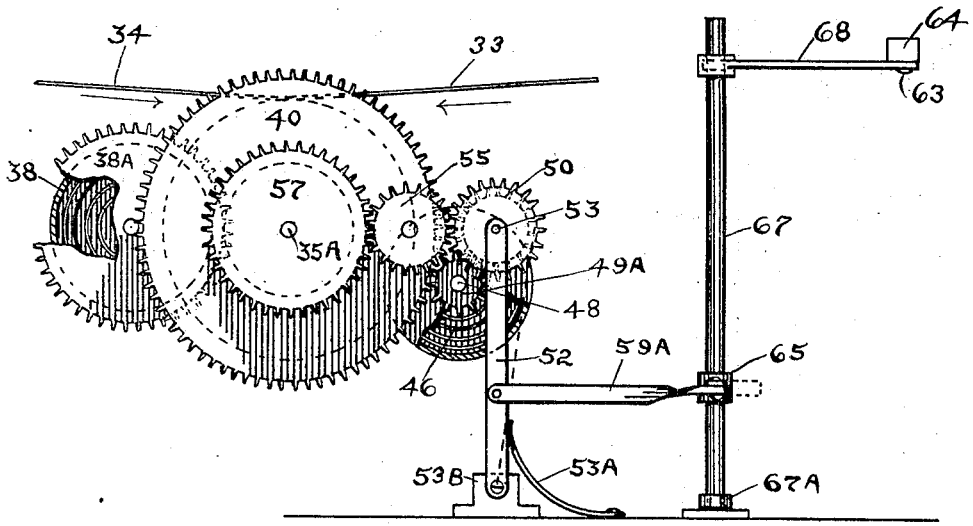
Figure 11:
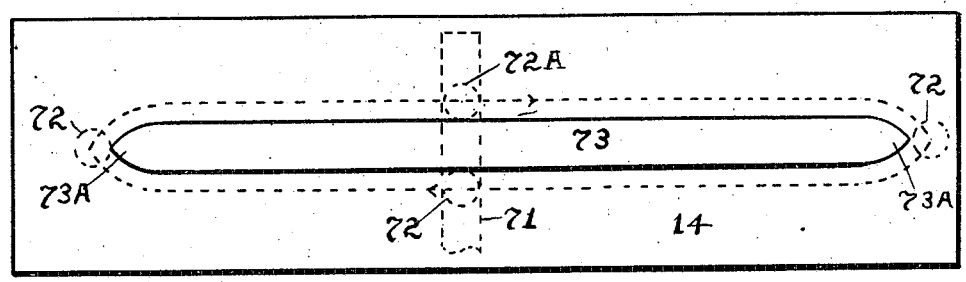
Figures 12, 13:
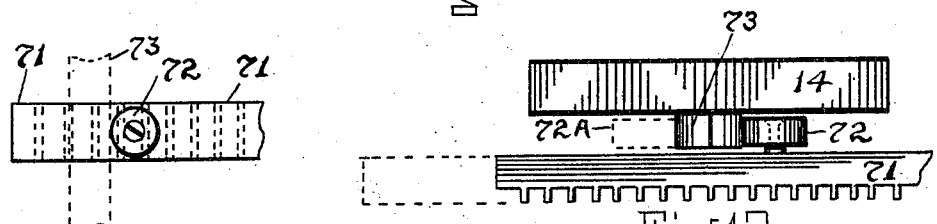
Figure 14:
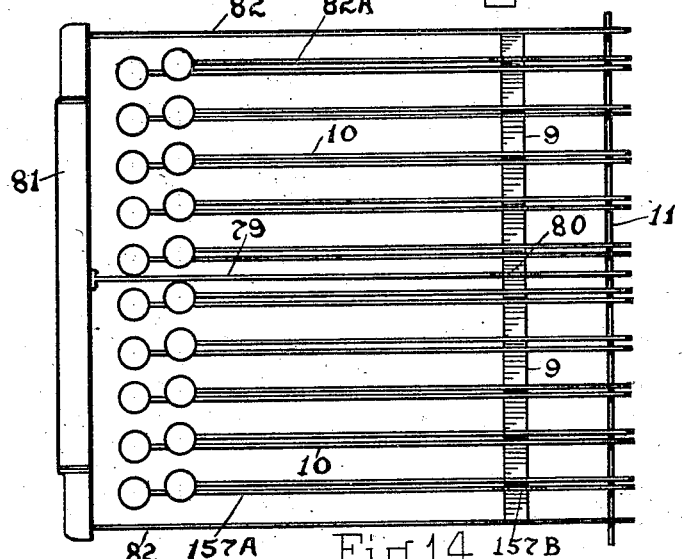

Figure 1 is a sectional elevation of the type-writing machine and shows the general arrangement of the mechanism. Fig. 2 is an enlarged end elevation of the carriage and its operating mechanism. Fig. 3 is a side elevation of the carriage-moving mechanism, consisting mainly of gear-wheels and springs or other prime mover capable of storing energy and transmit motion to the carriage. Fig. 4 is a plan of the carriage-operating mechanism. Fig. 5 is a cross-sectional view of the tracks or runways with a part end elevation of the lenticular-shaped wheels or rollers. Fig. 6 is a plan of the same. Fig. 7 is a cross-section of the tracks provided with thrust-rollers. Fig. 8 is a plan of the same. Fig. 9 is a sectional elevation of the ball-bearing lenticular carriage wheels or rollers. Fig. 10 is an elevation of the lenticular wheels, shown mostly in outline. Fig. 11 is a bottom plan of the carriage, showing the transverse bar located thereon. Fig. 12 is a part end view of the carriage and an end view of the trav-erse-bar with the rack-ended shifting-bar and its roller. Fig. 13 is a plan of the rack-ended bar and roller. Fig. 14 is a plan of a part of the keyboard, showing the approximate location of the special operating keys and levers. Fig. 15 is a part side elevation of the shifting or controlling rack-ended bar and its key-lever separated limit release or slip-joint. Fig. 16 is a plan of the same. Fig. 17 is a part-sectional elevation of the keyboard, showing the line-spacing-adjusting mechanism. Fig. 18 is an elevation of the polygonal cam or key-lever depression regulating disk or eccentric. Fig. 19 is a front view of the dial-plate and adjusting-knob. Fig. 20 is a front elevation of the notched line-space dial-wheel and its spring-pawl. Fig. 21 is an elevation, and Fig. 22 is a plan, of a device used in place of the plain spring shown in Fig. 1 at the lower end of the segmental gear-operating rod. Fig. 23 is a plan of the carriage, showing the end rack for engaging with the rotary buffer or paddle gear-wheel. Fig. 24 is a sectional elevation of the rotary buffer of fluid cushion. Fig. 25 is a perspective view of the buffer paddles, shaft, and gear-wheel. Fig. 26 is an elevation of the interior of the rotary buffer pawl-case. Fig. 27 is an elevation of the buffer gear and ratchet wheel. Fig. 28 is a sectional elevation of the pawl-case shown at Fig. 26. Fig. 29 is a rear end elevation of the automatic line-spacing mechanism. Fig. 30 is an enlarged elevation of mechanism shown at the left of Fig. 29. Fig. 31 is a plan of the diagonally-slotted cam-roller or spacing-cylinder. Fig. 32 is an end view of the same, showing the ratchet-wheel. Fig. 33 is an interior elevation of the pawl-case for the cam-roller ratchet-wheel 32. Fig. 34 is a side elevation of the ball-faced cam or lifting-toe for elevating the carriage for case changes. Fig. 35 is a cross-section of the ball-faced cam or toe, taken on the line 1 2 in Fig. 34. Fig. 36 is a side elevation, and Fig. 37 is a plan, of the carriage-supporting wheel-blocks and guide-pins and are used when the platen is to be lifted for printing upper-case characters. Fig. 38 is an end view of the stop-cylinder and its gage-pins. Fig. 39 is a rear end elevation of the carriage and platen, showing a modified form of the key-lever-operated line-spacing mechanism. Fig. 40 is an end elevation of the line-space ratchet-wheel and pawl-case. Fig. 41 is a sectional elevation of the line space ratchet-wheel, pawl-case, and pawls. Fig. 42 is an end view of the platen and its gear and ratchet wheel and its driving gear-wheel. Figs. 43 and 44 are side and end views, respectively, of the collars of the platen-driving-wheel shaft. Fig. 45 is a plan of the adjustment mechanism for altering the cushioning period of the carriage.

In the drawings, in which like reference-numerals indicate similar parts in all the views, 1, Fig. 1, is the main frame of the machine, having the usual keyboard portion 1ᴬ.

2 is the platen-roll, supported upon the end pieces 2ᴬ by the shaft or axis 2ᴮ, which can be rotated by means of the knobs 2ᶜ, Figs. 29, 30, and 45.

3 is the paper-feed roller.

4, Fig. 1, is the escapement feed-rack, and 5 is the escapement device for effecting a step-by-step motion to the carriage from the key-levers through the medium of the levers 6 7 8 8ᵃ and the universal bar 9, which are connected, as shown, to the key-levers 10, fulcrumed at 11.

12 is a pocket in the frame 1 for the carriage-return mechanism and is located transversely or across the width of the frame 1.

13 is the type-bar-operating rod by which the type-bar 13ᴬ is actuated for printing the characters usual in construction and for whatever type of machine used.

14 is the carriage, adapted for transverse movement upon the frame 1. The carriage is provided with pedestals or standards 14ᴬ, Figs. 1 and 9, upon which are attached the lenticular wheels 15, having hardened rounded approximate knife-edges 15ᴬ, supported on the shafts or pins 16, which are screwed to the pedestals 14ᴬ by the nuts 17. The axle 16 has a cylindrical end 18, having a beveled or cone portion, as shown in Fig. 9, so that the sleeve 19, having a corresponding bevel or cone portion which is screwed upon the axle 16 by the screw 19ᴬ, so that a V-shaped annular groove is formed inside of the bore 20 of the wheels 15 in alinement with a similar V-groove upon the inner circumference of the wheel itself. The grooves support the balls 21 in place, which are readily removed and replaced by loosening the screw 19ᴬ and sliding the sleeve 19 toward the standard 14ᴬ, thus occupying the position shown by the dotted lines in Fig. 9, and when the sleeve is in the position indicated by the full lines the V-groove is formed and capable of adjustment by the sleeve 19. By the axial adjustment of the sleeve the lenticular wheels or rollers are caused to swing true without a wabbling motion, as the balls are raised and depressed by lateral movement of the sleeve 19.

In order to provide a non-frictional rolling-surface, I provide tracks or runways 22, made of crown glass or other hard dense non-metallic substance, though I prefer glass, as the advantages thereof are that it does not require lubrication and the absence of appreciable wear and not being oxidized or corroded makes it desirable as a railway or track in addition to the non-frictional contact with the rounded knife-edges 15ᴬ of the hardened-steel wheels 15, renders the carriage movable with little effort.

The track 22 is provided with a flange or bead 22ᴬ, Figs. 5 and 6, of preferably a rounded or quadrant form in order to effect a bearing for the wheels or rollers 15 against the flange, the former being at a tangent with the latter, as in Fig. 5. In this manner side thrust is provided for by the least possible contact between the wheels 15 and the flange or bead 22ᴬ. The track 22 is provided with guard-plates 23, extending upon the surface of the track, leaving a small channel for the passage of the wheels 15, and are for the purpose of protecting the track against accidental breakage, the plates being secured to the frame 1 of the machine by the screws 24. The tracks 22 being of glass and the frame 1 of cast-iron or other metal, the coefficient of expansion of the two materials is different, and in order to allow for such expansion I provide some soft filling or insulation 25, preferably felt, which renders the track tight in its slot or channel, yet capable of contraction or extension during temperature changes.

In the case of front-strike type-writing machines when the side thrust is somewhat greater I provide the device shown in Figs. 7 and 8. In this modification the flange of the track 22 has the form of a right-angled trapezoid, as at 26, Fig. 7.

27 is a block or roller chair conforming to the angle of the flange 26, having a slot 27ᴬ, in which the thrust-roller 28 is supported for rotation on the pin 29.

28ᶜ, Figs. 7 and 9, is a narrow plate or bar fastened to the enlargement upon the shaft 16 and extends from one end of the carriage to the other or from axle to axle. The plate 28ᶜ is supported by the depending brackets 28ᴰ and secured thereto by screws 28ᴱ. The plate is adapted to move over the rollers as the carriage is operated, thus keeping the wheels 15 in a fixed point upon the track, but may be varied by increasing the lower or L-shaped portions of the brackets.

The chair 27 is provided with a flange or plate portion 28ᴬ, having a slot 28ᴮ therein, so that the roller may be adjusted either inward or outward, as desired, and held in the adjusted position by the screws 30.

I may use any number of the thrust-rollers, according to circumstances, though I am not confined to their use, as they may not be necessary unless the thrust of the carriage is unusually great.

Referring to Fig. 2, the carriage 14 is provided with two depending lugs 31 and 32 on each end, to which is attached the belts or metal tape 33 and 34 at one of their ends. The other ends of the belts or tapes are circumferentially secured to the drum 35, which is actuated through its shaft 35$^A$. In this manner motion is imparted to the carriage by means of suitable motors and gearing, as will be hereinafter described.

In place of the belts or bands 33 and 34 I may employ the rack 36, Figs. 2 and 39, fastened to some suitable point beneath the carriage 14 and driven by a toothed annulus or gear-wheel attached to the belt or tape drum 35.

Referring to Fig. 4, which being a plan more clearly shows the automatic carriage-return mechanism indicated in Figs. 1, 2, and 3.)

38 is a maximum-powered spring or other motor having a gear-wheel 38$^A$ and holding-ratchet 38$^B$. The wheel 38$^A$ meshes with a pinion 39 on the shaft or belt-drum axle 35$^A$, which also carries the large center wheel 40. The gear-wheel 40 alternately meshes with the clutch-wheel 41, which is adapted to engage and disengage the wheel 40 at certain intervals during the lateral movement of the carriage. The wheel 41 has a gear 42, forming a part of and concentric with it, but usually of a smaller diameter. The two wheels 41 and 42 are rockably supported upon the rocker-arm 43 and rotatorily pivoted thereto by the pin 44, the arm 43 being pivoted at 45, Fig. 2.

46 is a minimum-powered spring provided with a holding-ratchet wheel 47 and rotating the shaft 48, upon which are fixed two pinions 49 and 49$^A$. The springs 38 and 46 are wound by pawls acting on ratchet-wheels in the usual manner; but I do not show such.

In Fig. 2 the spring 47 is shown at the right. The dotted lines 47$^A$ show a better position, which corresponds approximately to the position shown in Fig. 4. The pinion 49 is adapted to engage the wheel 42 simultaneously with the contact of the wheels 40 and 41.

50 is a wheel similar to that at 41 and having a concentric gear-wheel 51 of a smaller diameter forming a part thereof.

The wheels 50 and 51 are supported upon the rocker-arm 52 and rotating around the axle or pin 53.

The rocker-arm 53, with its gear-wheels, is held in proper contact with its communicating train of gears by the spring 53$^A$, located a short distance about the rocker-arm pivot-block connection 53$^B$, Fig. 3.

54 is a shaft supporting the intermediate or idle wheel 55, which alternately meshes with the wheel 50 and occurs simultaneously with the engagement of the wheel 51 and pinion 49$^A$. The axle or shaft 54 is fixed to journal-plate 56, which also supports the shafts 35$^A$ and 48 for rotation. The idle wheel 55 is in mesh with the wheel 57, located upon the main or belt-drum shaft 35$^A$.

58 is a link pivoted to the front rocker-arm 43 at one end and at the other with the arm 59 at the joint 58$^A$, having a hub or boss portion 60, located upon the shifting-rod 61, the arms 59 and 62 forming a bell-crank by which the clutch-gearing is thrown in and out of engagement with the described train of gears. In like manner the rear rocker-arm 52 is connected to a link 59$^A$, the other end thereof being connected, as at 59$^A$, to a similar arm of the bell-crank, as will be described hereinafter. The link, Fig. 4, transmits motion to the rocker-arm by the bell-crank 61 and 62, pivoted to the controlling or shifting bar 64.

65 is one arm of the rear bell-crank, which is provided with a hub or boss portion 66, secured to the rear shifting-rod 67, rotatorily supported in the step-bearing 67$^A$, 68 being the other arm of the bell-crank and is pivoted to the shifting-bar 64 at 69. The bell-cranks, Fig. 4, are oppositely disposed, so that the clutch-wheels 41, 42, 50, and 51 are alternately thrown in and out of gear with the wheels 40 and 55 and the pinions 49 and 49$^A$.

70, Fig. 2, represents standards for slidably supporting the bar 64, which is provided with a toothed or rack end 71, having a transverse roller 72, which assumes the position shown at 72$^A$, Fig. 11, by dotted lines when on the opposite side of the traverse-bar 73.

Referring to Figs. 2 and 11, the carriage 14 is provided with lateral projection or bar 73, either a part of or affixed to the bottom of the carriage and traveling therewith and is therefore in a depending position and of a length to correspond to the length of the writing-line. The traverse-bar 73 is provided with rounded or pointed ends 73$^A$, Fig. 11, to permit the roller 72 on the rack 71 to pass around the ends of the bar 73 and traverse first one side and then the other. The rack 71 meshes with the segmental gear 74, pivoted at 75 on the frame 1, Fig. 2, and is provided with an arm 76, to which is fastened the operating-rod 77, the lower end of the rod 77 being connected by resilient means to a special key-lever 79.

In Figs. 21 and 22 I show a preferable arrangement for the resilient connection of the rod 77 to the key-lever 79 instead of the arrangement shown in Fig. 1. The rod 77 is divided, and at the point of division there are fixed two plates 77$^A$ and 77$^B$, Fig. 21, the ends of the rods passing through the plates, forming a rectangular cage for the spring 78, as shown. The plate 77$^A$, when operated by the middle space-lever 79, which is arched, so as to bridge the universal bar 9 to prevent operation of the escapement mechanism, and the spring 78 takes up the downward motion of the lever 79 when the segmental gear 74 is prevented from performing its function by the traverse bar 73. Therefore a pull upon the rod 77 causes the parts 77^A and 77^B to approach each other and compress the spring 78.

The above-described operation takes place automatically when the carriage reaches the end or limit of its stroke. It is obvious that in writing short lines or one or more words it is necessary to return the carriage to its initial position before the end of the stroke. This operation I accomplish by means of the limit-release key-lever 82^A, Figs. 14 and 15, having an arched portion 82^B for bridging the universal bar 9, operated by the levers 82.

In order to shift the clutch gear-wheels 41, 42, 51, and 52 without disturbing the position of the segmental gear 74, which is prevented by the traverse-bar being in front of it, I use the device shown in Fig. 15. In this view the bar 64 is divided between its end and the rack portion 71. The rack 71 has an angular block 83 fastened to it, into which is secured a rod 84, having a head or button 84^A thereon. The rod 84 passes through the adjacent lugs 85 and 86 on the division-bar 87, which is in turn secured to the shifting or controlling bar 64.

87^A is a spring encircling the rod 84 and between the lugs 85 and 86.

When the device is operated by hand, the lug 85 changes to the position shown by the dotted lines 87^B, which returns the carriage, the rack 71 having a direction of movement when automatically operated as shown by the arrow. The rack 71 is not actuated when the changing is done by hand.

When the key-lever 82^A is released to the position shown by the full lines, the segmental gear is in operative position for effecting the change when the roller 72 runs upon the front side of the traverse-bar 73. The bar 64 is connected to one arm 88 of the bell-crank and pivoted at 89, the other arm of which is pivotally connected to a link or rod 90, attached to the key-lever 82^A at 91.

Referring to Fig. 4, which is the position assumed by the mechanism for ordinary step-by-step spacing movement produced by the escapement mechanism in writing, the step-by-step motion is produced by the motor-spring 46, and its movement is therefore slow, except when tabulating during the action of the spring 46 the spring 48 is being put into tension in order to store up energy for the return stroke of the carriage, which the spring 46 is enabled to do, although the weaker spring on account of its power being augmented by gearing, the wheels 41 and 42 being engaged with the wheel 40 and the pinion 49, while those at 50 and 51 are disengaged from the wheel 55 and the pinion 49^A. When the carriage reaches a certain point, the automatic shifting of the gear-wheels on the rocker-arms 43 and 52 connect the train of gears, so as to change the relative strength of the springs, thus making the spring 38 exert the greater force for the carriage return, yet capable of being rewound by the periodic movement of the spring 46 when connected to the power-multiplying gear-wheel train.

In Fig. 4 the spring 46 is in operation driving the carriage to the left, as usual, the pinion 49 transmitting the motion through the wheels 41 and 42 to the large wheel 40, which is approximately three times the diameter of the wheel 41 and is therefore in gear for power.

The spring 38 is provided with the wheel 38^A and is approximately twice the diameter of the wheel 39 which drives it, and thus winds the spring.

When the wheels 41 and 42 are out and the wheels 50 and 51 are in gear, the spring 38 exerts power to drive the wheel 38^A, the smaller wheel 39, and the larger wheel 40, though it is not in meshing contact with the wheel 41. It transmits no motion to the other wheels and is consequently idle during the return of the carriage. The spring 38 through the shaft or axle 35^A, rotates the wheels 55 and 57 and through the wheels 50 and 51 to the pinion 49^A on the shaft 48 and winds the spring 46. The spring 38 is stronger than that at 46. Therefore the momentum of the carriage during its quick return, together with the gear-wheels 51 55 57 and the pinion 49^A is sufficient to wind it.

The carriage being provided with ball-bearing knife-edge rollers and wheels running on a glass track, the resistance of the carriage to a moving force is extremely slight. The wheels 41 and 42 are simultaneously disengaged. Therefore holding-ratchets are not used, except when necessary to wind the springs by hand. When it is required to return the carriage by hand, as is the case with rdinary machines, the wheels 41, 42, 50, and 51 are held permanently out of gear by suitable means.

As already described, the automatic return of the carriage is effected by the segmental gear 74, which causes the rack 71 to be pulled forward or backward when the roller 72 traverses the back and front sides of the bar 73, thus operating the bar 64, which throws the proper gearing into position. The rod 77 operates the segmental gear 74 by means of the bar 79, attached to and operated by the space-bar 81, the spring 78 permitting a downward pull of the space-bar when spacing during the printing operation without operating the segmental gear until the carriage has reached a certain point. When the segmental gear 74 is released, the spring 78 is sufficiently strong to give the same effect as if the bar 77 was rigidly connected to the bar 79. The traverse-bar 73 is of such a length as to correspond to the length of the writing-line, the roller 72 being normally in the rear of the bar 73 when writing in the ordinary manner.

It will be thus seen that the bar 73 acts as a check or lock against the forward motion of the rack 71, holding the proper gearing in position until such times as it is necessary to change them to return the carriage either automatically at the end of the writing-line or by hand at any point of the carriage transverse stroke. When the carriage is returned to the initial point or commencement of the writing-line, there is considerable impact or jar imparted thereto due to the sudden stoppage.

In order to arrest the carriage quietly, I provide a rotary cushion consisting of a cylindrical box or case 92, Fig. 24, having a filling-plug 92$^A$ for the fluid, which consists of oil, glycerin, or other liquid with which the box or case is filled to a more or less depth, according to circumstances.

93 is a bearing-sleeve on the cushion cylinder or box 92.

94 is the buffer or paddle-shaft, having a gear-wheel 95 on its upper end which meshes with the rack 95$^A$, placed upon a suitable point on the carriage 14 and in mesh with the wheel 95 at a point near the limit of the stroke of the carriage, and therefore in striking alinement when out of mesh and when the carriage is at the beginning of the writing-line. The rack 95$^A$ is mounted upon the bar 95$^B$, Fig. 41, which contains a horizontal slot 95$^C$ for adjustment of the rack by the screw 95$^D$ to enable the cushioning effect to take effect earlier or later in the stroke of the carriage. The shaft 94 is provided with a backing ratchet-wheel 95, concentric with and below the gear-wheel 95, but rotating with it.

97 is a pawl-case fastened to the shaft 94, in which is placed oppositely-disposed pawls 98, held upon the teeth of the ratchet-wheel 96 by the springs 98$^A$. The object of the ratchet and pawls is to allow the rotation of the shaft only when the carriage is nearly at the end of the writing-line; but during the opposite movement thereof the pawls pass over the teeth of the ratchet-wheel without imparting motion to or offering any resistance to the escapement mechanism. 99 is a cone-shaped pivot end on the lower part of the shaft 94 and fits with a corresponding-shaped step-bearing 100, located within and upon the bottom of the case or base 92.

101, Figs. 24 and 25, represents the cushioning or buffer paddles preferably arranged at right angles to each other, as shown in Fig. 25. The paddles are submerged in oil, glycerin, or other fluid contained in the case 92, and when the carriage returns the resistance of the fluid when the paddles 101 are rotated rapidly is comparatively great, while a slow rotation of the paddles offers little retarding action. Thus the impact is fully prevented very near the end of the writing-line, bringing the carriage at rest quietly without any compressing action or recoil usual with air-cushioning devices. The pawl-case is secured upon the shaft 94, the sleeve 102 acting as a bearing on the sleeve 93, and is fastened to the shaft by the set-screw 103, Fig. 28.

In order that the desired line-spacing may be accomplished automatically after the carriage is returned to the initial writing-point, I employ the mechanism shown in Fig. 29.

The platen 2 is provided with two gear-wheels 104 and 105 upon the ends thereof, which mesh with the wheels 106 and 106$^A$ on the square or polygonal shaft 107.

The gears 106 and 106$^A$ are driven by the gear-wheel 108, slidably mounted upon the shaft 107, which is also rotated by the shrouded wheel 109, slidably located on the driving-shaft 110, having a round portion 110$^A$, Fig. 29, supported in the standard 110$^B$, Fig. 39, as will be more fully explained hereinafter. The purpose of having the wheels 108 and 109, Fig. 29, slidable is to enable them to remain in mesh though the carriage be moved beyond the main frame of the machine as the end of the carriage passes beyond the center of the frame in its transverse movement. Therefore both gears will slide to keep together. The flanges on the wheel 109 carry its mating wheel with it.

When the platen is elevated for printing upper-case characters, it is evident that the wheels 108 and 109 will be separated, and to overcome this I provide a bevel or miter wheel 111, having a spring 112, which allows it to keep in mesh with the bevel-wheel 113 and slide upon each other when the platen is elevated and to return to their normal positions, as shown by the full lines on Fig. 29 and by the dotted lines at the left of the bevel-wheel 111. The wheels 111 and 113 are connected to the wheels 108 and 109 by a short sleeve, (not shown,) the spring 112 acting to cause the wheel 111 to slide upon 113 when the platen is lifted, yet kept in mesh by the wheels sliding axially upon the toothed portions.

In this my present invention I have assumed that the platen is vertically lifted for case changes, but I am not confined to such, as I may adopt my invention readily to effect the case changes by a horizontal or back-and-forth movement of the platen. The shifting of the platen for case changes is effected by a lifting toe or cam 114, Figs. 29, 34, and 35, which is made in two separable halves, as shown at 114 and 114$^A$, Fig. 35, inclosing the balls 115. The cam or toe is pivoted at 116 and provided with an arm 117, to which the rod 118 is attached, so as to enable the cam to be operated from the keyboard in the ordinary manner.

119 is a screw for securing the halves 114 and 114$^A$ together.

The carriage 14 is provided with a concave groove or a concave projection 120 in the direction of its length in order to allow it to rest upon the balls 115 in the lifting toe or cam, so that the cam can raise the platen at any point of its travel and during its movement. The two sides 114 and 114ᴬ of the cam are so made as to form a V-shaped groove 121 when the two parts are together, and at the outer edge of the groove 121 there is formed a V-shaped or angular knife-edge ball-confining projection 122, which holds the balls in position a little above their diametrical axis. The balls are disposed on the edge of the cam, as indicated in Fig. 34.

In order to guide the carriage 14 in vertical alinement, I provide blocks 123, Figs. 29, 36, and 37, having a projection 123ᴬ, the guide-pins 124, which are usually of a square or rectangular cross-section, passing through a corresponding aperture in the carriage base or bottom plate and are for guiding the carriage for a vertical movement.

I will now describe the automatic linespace and some of its modifications which are adapted to suit different conditions.

125, Figs. 29, 30, and 38, is a stop-cylinder or plunger, and 126 is a sleeve normally in abutting relation to the stop-cylinder, allowing the same to rotate and admitting of only reciprocating movement to the sleeve and is supported for such movement in the standard 127. The cylinder-shaft 128 is slidably mounted in the sleeve 126, which sleeve is in turn mounted in the standard or support 127, the plunger 125 not being fixedly connected with the shaft 128 and has no longitudinal movement. The stop-cylinder or spacing-plunger 125 is provided with pins 129, 130, and 131 of unequal lengths, so as to correspond to the line-spacing distance. Three changes for different spacing of the meeting lines is usually sufficient, though I may use greater number, if deemed expedient.

132 is a striking-lug, Fig. 29, located on some convenient point upon the carriage and in striking relation with one of the pins 129, 130, and 131 when the carriage reaches the end of its stroke, which motion causes the stop-cylinder and its sleeve 126 to be driven toward the left of Figs. 29 and 30, the view showing the stop-cylinder and sleeve at the end of its travel, their previous or extended position being indicated in Fig. 29.

133 is a pin or key in the shaft 128, which acts as a bearing-point for the spring 134, located in a suitable cavity in one end of the sleeve 126, and its object being to restore the stop-cylinder to the position indicated by dotted lines at the right of Fig. 30 for a subsequent stroke. The sleeve 126 is provided with a depending lug or tongue 135, normally in the diagonal or angular slot or groove 136, cut into the spring-cylinder or gage-roller 137, loose upon the shaft 110, pawl and ratchet connection therewith.

137ᴬ is a bevel or miter gear-wheel on the stop-cylinder shaft 128 and meshes with a corresponding gear-wheel 138 upon the vertical shaft 138ᴬ, connected with a gear-wheel 139 near the bottom of the machine, which in turn meshes with the gear-wheel 140, Fig. 29, on the horizontal shaft 141, the shaft extending to the outside of the keyboard near the bottom of the machine.

142 is a polygonal eccentric or cam for adjusting the amount of depression of the line-spacing key-lever when operated by hand and will be more fully described at the proper point.

The position of the pins 129, 130, and 131 is adjusted by means of the shaft 141, Figs. 17, 19, 20, and 29, which carries a notched wheel or disk 143 on the inner side of the keyboard, the notches 144 upon the face of the disk corresponding to the width of the line-spacing and adapted to be fixed in adjustment by the spring tongue or stop having an end piece to suit the notches in the disk, but capable of being disengaged by hand in making adjustments.

146 is a dial-plate suitably divided into parts, at which the index or pointer 147 is set to the desired line-spacing by the knob or button 148, the dial index or pointer and the knob being located on the outside of the keyboard, so as to be in easy reach.

The shaft 141 transmits motion to the vertical shaft 138 and thence to the stop-cylinder 125 and coincidently sets the eccentric 142 in the same relative position as the pins 129, 130, and 131, so that the hand line-spacing can be accomplished at any time or independently of the automatic mechanism previously explained.

149, Figs. 30, 31, and 32, is a backing ratchet-wheel secured to the spacing-cylinder 137 at one end thereof and over which the pawl-case 150 is placed, containing pawls or detents 151 and 152, which allow the cylinder 137 to turn in one direction only upon the shaft 110ᴬ, the pawl-case being fastened thereon, while the cylinder and its ratchet-wheel are free to turn upon it, the object being to enable the hand-spacing to be accomplished without disturbing the cylinder 137, which assumes a more or less fraction of a revolution during the automatic working of the mechanism.

153, Figs. 30, 39, 40, and 41, is the pawl-case, 154 the ratchet located on the shaft 110, and 155 the pawls of the hand operating mechanism, the ratchet-wheel being oppositely-disposed to that at 149, Fig. 32.

156 is an arm attached to the pawl-case 153 at 156ᴬ, the sleeve 156ᴬ being loose on the round part 110ᴬ of the polygonal shaft 110, so that when the arm 156 is pulled downward by the rod 157 by depression of the key-lever 157ᴬ the ratchet is driven to the left, Fig. 40. The extent of such movement of the ratchet is governed by the amount of depression given to the key-lever. Thus for a greater width between lines the ratchet-wheel 154 moves a larger fraction of its revolution. The key-lever 157^A has an arched portion 157^B to enable it to clear the universal bar which forms a part of the mechanism of ordinary type-writers.

Referring to Fig. 18, in which is shown the polygonal or multisided eccentric 142, by which the depression of the key-lever, and consequently the extent of the line-spacing, is governed when operated by the finger key-lever, as indicated in Fig. 18, the eccentric or cam 142 is attached to the shaft 141 and does not pass through the center of the cam. I prefer to use a hexagon-shaped disk, as shown, so that by turning it to the left, as indicated, three degrees of adjustment can be procured, as shown, by the full and dotted lines in Fig. 18.

158, Fig. 41, is a spring for returning the arm 156 to its normal position and is secured to a fixed point upon the standard 110^B.

Referring to Figs. 39 and 42, which show a modified form of the key-lever-operated part of the mechanism shown in Fig. 29, which consist of the wheel 159 and drives the shrouded gear-wheel 160, to which is fastened the line-spacing ratchet 161, both of which are in turn secured to the platen 2. The platen is driven by the gear-wheel 159 when the polygonal shaft 110 is rotated, the shaft being long enough to allow the platen end pieces 2^A to move a full stroke, as shown by the broken right-hand end of the shaft or rod in Fig. 39. The shaft 110 is driven by the ratchet 154 through the key-lever 157^A and its attendant mechanism, (shown in Figs. 40 and 41,) as has been already described.

In order to rotatorily drive the shaft and allow of a sliding movement thereof through the platen end pieces 2^A, I provide collars or bushings 162, having a flange or rivet-head 163, Figs. 43 and 45, which are inserted in circular apertures made into the platen-supports 2^A and free to turn therein and are located in the position as shown in Fig. 39, as at 163. The collars are provided with polygonal aperture 164, Fig. 44, for the slidable passage of the rod or shaft 110.

Having described my invention, what I claim, and desire to secure by Letters Patent, is—

1. In a type-writing machine, a carriage therefor, of a carriage transverse driving mechanism comprising a low-powered motor adapted to feed the carriage in the printing direction, a high-powered motor for returning the carriage in a reverse direction, power multiplying and diminishing means between the motors, and carriage-controlled connecting and disconnecting means included in the said multiplying and diminishing means for operating the motors one by the other alternately at a maximum and minimum power.

2. In a type-writing machine, the combination with a carriage, a transverse carriage-driving mechanism comprising a low-powered motor for feeding the carriage in one direction, a high-powered motor for returning the carriage to the initial writing-point, power multiplying and absorbing means between the motors, means for storing energy of one motor to operate the other, and carriage-controlled rotating means to throw both motors alternately into action for operating the carriage in both directions.

3. In a type-writing machine, the combination with a carriage, a transverse driving means therefor comprising a low-powered motor for feeding the same in one direction and a high-powered motor for returning the carriage automatically to the beginning of the feed-motor effect thereon, a power multiplying and diminishing means between the said motors and normally connected therewith, automatic and non-automatic means for furnishing a surplus of energy of an active motor into the other for its subsequent action, and carriage-controlled means to throw the motors alternately into effective action for operating the carriage in two directions.

4. In a type-writing machine, a carriage therefor, of a transverse carriage-driving means comprising a maximum-powered motor for driving the carriage in one direction, a minimum-powered motor for driving thereof in an opposite direction, power multiplying and compensating means between the motors for storing energy into the maximum-powered motor by the minimum-powered motor, and automatic and non-automatic alternating connecting means for changing the ratio of power of the said multiplying and compensating means.

5. In a type-writing machine, a movable carriage and platen, of a transverse driving means therefor comprising a minimum-powered motor for feeding the carriage in one direction, a maximum-powered motor for returning the carriage in a reverse direction to the initial writing-point, a power mulitplying and compensating means forming a connection between the said motors for driving the said maximum-powered motor, and carriage-controlled shiftable power-reinforcing means for the said multiplying and compensating means for effecting changes of power thereof and the direction of the carriage travel.

6. In a type-writing machine, the combination with a carriage of a transverse driving means therefor comprising a maximum-powered motor for driving the carriage in one direction, a minimum-powered motor for driving the carriage in a reverse direction, power-multiplying means for storing energy into the maximum-powered motor by the minimum-powered motor, power-storing means for the minimum-powered motor by the maximum-powered motor, and carriage-controlled shiftable means for alternately coupling the proper ratio of power and speed to the multiplying means, and means for changing the direction of carriage travel by the said shiftable means.

7. In a type-writing machine, a movable carriage therefor, of a transverse carriage-actuating mechanism comprising a maximum-powered motor for driving the carriage in one direction, a minimum-powered motor for driving thereof in a reverse direction, power-multiplying means between each of the said motors for varying the power thereof, and carriage-controlled rotary shiftable means for connecting the said motors to effect a storage of power given out by one motor into the other.

8. In a type-writing machine, a carriage therefor, a transverse carriage mechanism comprising a maximum-powered motor for driving the carriage in one direction, a minimum-powered motor for driving thereof in an opposite direction disconnected power multiplying and compensating means between the said motors, shiftable reinforcing means for connecting the said multiplying means with the motors, means for storing energy into one motor by the other through the said shiftable means, for driving the carriage in a right and left hand direction.

9. In a type-writing machine, a transversely-movable carriage therefor, of a carriage-driving mechanism comprising a maximum-powered motor for driving the carriage in one direction, a minimum-powered motor for driving the carriage in a reverse direction, disconnected power-multiplying means between the motors, shifting connecting means controlled by the carriage for coupling each motor to the multiplying means for storing the unexpended energy of one motor during its carriage-driving action into the other.

10. In a type-writing machine, a carriage therefor, of a carriage transversely-actuating mechanism comprising a maximum-powered motor for driving the carriage in one direction, a minimum-powered motor for driving thereof in an opposite direction, a train of gearing between each motor, and clutch means for connecting each motor with the said train of gearing for storing energy in one motor by the action of the other when driving the carriage.

11. In a type-writing machine, a paper-carriage therefor, of a transverse carriage-driving mechanism comprising a maximum-powered motor for operating the carriage to the right, a minimum-powered motor for operating thereof to the left, a train of multiplying and compensating gearing between the motors, connecting means for operating the motors alternately, and means for communicating energy to the maximum-powered motor when the said connecting means is established between the said motors.

12. In a type-writing machine, a carriage therefor, of a carriage-driving mechanism comprising a minimum-powered motor adapted for intermittent rotation for operating the carriage in a left-hand direction, a maximum-powered motor for actuating the carriage in an opposite direction, a series of rotary communicating means for connecting the motors alternately into operative contact with the said multiplying means, and intermittent power-increasing means actuated by the minimum-powered motor for driving the carriage in a reverse direction thereto.

13. In a type-writing machine, in combination with a carriage therefor, of a transverse carriage-driving mechanism comprising a minimum-powered motor adapted to feed the carriage step by step in one direction, a maximum-powered motor adapted to return the carriage continuously in a reverse direction to the initial writing-point, a series of power multiplying and compensating means between each motor, shifting connecting means coöperating with the multiplying and compensating means for actuating each motor independently for opposite carriage movements, and means alternately coacting with the said multiplying and compensating means for storing energy into one motor for subsequent action by the driving effort of the other.

14. In a type-writing machine, a carriage therefor, of a transverse carriage-driving mechanism comprising a minimum-powered motor for intermittently driving the carriage in one direction a maximum-powered motor for actuating thereof continuously in an opposite direction to the limit of the carriage-stroke, a series of interposed multiplying and compensating gearing between the said motors, rotary clutch means for connecting the minimum-powered motor to drive the carriage, rotary clutch-connecting means for disengaging the minimum-powered motor and coupling the maximum-powered motors for returning the carriage after the driving effect of the said intermittently-acting motor, and means for storing energy of one motor by the action of the other through the said multiplying and compensating gearing and the rotary clutch means.

15. In a type-writing machine, a carriage therefor, of a transverse carriage-actuating mechanism comprising a minimum-powered motor for driving the carriage step by step in one direction, a maximum-powered motor for driving thereof in an opposite direction to the commencement of the writing-point, a series of power multiplying and compensating devices between the motors, rotary clutch means for throwing the multiplying means alternately into variable-power connection with the motors, means for imparting a reverse force by the minimum-powered motor through the multiplying and compensating devices, means for delivering unexpended energy to the minimum-powered motor by the maximum-powered motor for a subsequent action thereof, and automatic means for governing the period of action of the said motors.

16. In a type-writing machine, of a carriage therefor, a carriage transverse actuating mechanism comprising sundry carriage-driving means, one element thereof consisting of a prime mover powered for minimum effect for intermittently moving the carriage in one direction, a prime mover powered for maximum effect for continuously moving the carriage in a reverse direction, power multiplying and governing means between the said prime movers to alter their power relation with the multiplying means, and means for imparting stored energy into one motor as the other moves the carriage.

17. In a type-writing machine, a carriage therefor, of a carriage-driving mechanism comprising two motors for actuating thereof in opposite directions, one of the said motors being powered for minimum effect for driving the carriage for printing, the other motor therefor being maximum-powered for returning the carriage to the initial writing-point, power delivering and absorbing means between the motors, power increasing and decreasing means interposed between the motors to effect a transfer of power to one by the action of the other in driving the carriage, means controlled by the carriage and the multiplying and interposed means for storing energy into one motor in a reverse direction of rotation by the action of the other, and means controlled by the carriage for effecting a change of direction of the carriage and power of the motors.

18. In a type-writing machine, a carriage therefor, of a carriage-actuating mechanism comprising a minimum-powered prime mover for feeding the carriage in one direction, a maximum-powered unrestricted motor for moving the carriage in an opposite direction, power delivering and absorbing means between the motors, carriage-controlled interposed gearing adapted to actuate one motor and then the other, means for storing energy into the maximum-powered motor by the minimum-powered motor, means controlled by the said multiplying means for storing energy by the maximum-powered motor into the minimum-powered motor and means for operating one motor independently of the other.

19. In a type-writing machine, a carriage therefor, an escapement device, of a carriage-driving mechanism comprising a minimum-powered escapement-controlled motor for driving the carriage in one direction from the initial writing-point, a maximum-powered motor for driving the carriage continuously in a reverse direction for returning thereof to the initial writing-point, power multiplying and compensating means between the motors, shifting reinforcing gearing means for the said multiplying and compensating means and controlled by the carriage for storing energy into one motor by the other for driving the said carriage in two transverse directions, and means for operating each motor independently of the other.

20. In a type-writing machine, a carriage therefor an escapement device, of a transverse driving mechanism comprising a minimum-powered motor controlled by the escapement device for intermittently driving the carriage in one direction from the initial writing-point, a maximum-powered motor adapted to return the carriage to the initial writing-point, disconnected power multiplying and compensating means between the motors, periodically-interposed means for connection with the said multiplying and compensating means for determining the direction of effort of the motors, means produced by the said multiplying and compensating means for storing surplus energy of one motor for the subsequent operation of the other in a reverse direction for driving the carriage, means for actuating one of the said motors independently of the other, and means for disconnecting both motors from the said multiplying and compensating means and for the carriage.

21. In a type-writing machine a carriage and escapement device therefor, of a carriage duplex driving means comprising a minimum-powered motor adapted to drive the carriage from the initial point in a direction controlled by the escapement device, a maximum-powered motor adapted to return the carriage to the initial writing-point, a series of power-varying means between the motors, a series of shiftable connecting reinforcing means for the said power-varying means for transferring the carriage from one motor to the other to effect a control thereof by either motor, automatic means controlled by the carriage for causing the said transfer of motors at intervals for a right and left hand movement when actuated by the shiftable means, means independent of the carriage for effecting the said transfer, and means controlled by the said power-varying devices and the shiftable means for actuating one motor by the surplus energy of the other expended in driving the carriage in both directions.

22. In a type-writing machine, a carriage and escapement therefor, of a carriage-driving mechanism comprising a motor adapted to drive the carriage in a direction controlled by the escapement from the initial writing-point to the end of the writing-line, a motor adapted to drive the carriage in a return direction from the end of the writing-line to the initial point thereof, power increasing and decreasing means between the said motors, means for releasing the carriage from one motor effect and transferring it to another for reverse travel thereof, means for storing surplus energy in one motor from the other after a transfer for a subsequent action in the return and the escapement-controlled direction, automatic and non-automatic means for effecting the said transfer of motors and the power thereof, means for controlling the counter-action of the motors until a transfer thereof is made means for inserting reinforcing-gearing in connection with the said power increasing and decreasing means when controlled by and independent of the carriage, and means for locking either motor out of connecting with the said reinforcing means.

23. In a type-writing machine and the similar apparatus, a carriage and escapement device therefor, of a lateral carriage-actuating means comprising a minimum-powered motor for driving the carriage in a direction for writing when controlled by the escapement device, a maximum-powered motor for returning the carriage when the end of the writing-line is reached to the initial point thereof, a series of intermeshing carriage-controlled power and speed varying means between the motors, a series of alternating shifting means for connection to the said power and speed varying means, means controlled by the said power varying and shifting means for storing surplus energy from one motor into the other for driving the carriage, means for automatically and non-automatically changing the motors for opposite carriage movements, and means controlled by the carriage and independently thereof for changing the motors and the direction of the carriage travel.

24. In a type-writing machine, the combination with a carriage and platen, an escapement device, a keyboard, of a lateral duplex carriage-driving mechanism comprising a motor powered for maximum effect, a motor having a lesser power, means for rotating the said motors in an opposite direction, carriage-controlled shifting connection power increasing and decreasing means for coupling one motor after the action of the other, means controlled from the keyboard for shifting each motor off and on the carriage independent thereof, means for actuating one motor by the surplus energy of the other motor, and means for controlling both motors by the escapement device for intermittently moving the carriage in a right and left hand direction.

25. In a type-writing machine of a carriage, an escapement device, of a lateral duplex carriage-driving mechanism comprising a motor for driving the carriage in a left-hand direction, a motor for driving the carriage in a right-hand direction, disconnected compensating and power-changing means between each motor, shifting rotary connecting means for coupling a change of power and speed ratios between the motors in combination with the said compensating and power-changing means, means coöperating with the power-changing means for altering the power of the motors when actuated in a direction contrary to the carriage-driving effort, means for coupling the motors for storing energy into one by the other for a subsequent driving thereof to move the carriage, automatic means located at each end of the carriage and controlled thereby and the said shifting means for connecting one motor and disconnecting the other for driving the carriage in an opposite direction at the beginning and end of the writing-line.

26. In a type-writing machine, the combination with a carriage an escapement device, of a carriage-actuating mechanism consisting of a periodically-connected duplex carriage-driving means, a series of variable power-motors comprising said driving means one of the motors being effective for driving the carriage in one direction, controlling means for connecting the motors for altering the power ratio with respect to each other, carriage-controlled connecting means for driving the carriage by each motor for a change of travel, power-absorbing means in each inactive motor while the other is acting, and means for subsequently driving the carriage by the said inactive motor for a reverse carriage movement.

27. In a type-writing machine, the combination with a traveling carriage and platen-roll, an escapement device for stepping the carriage, of a carriage-driving mechanism comprising a low-power motor adapted to drive the carriage in a direction controlled by the escapement device, a high-power motor adapted to drive the carriage in a reverse direction out of connection with the escapement, power and speed increasing and decreasing means between the motors, alternate power-reinforcing means controlled by the carriage for altering the ratio of power in the said power and speed increasing and decreasing means, means for storing power in one motor by the other for a subsequent driving effect on the carriage, means for automatically transferring one motor to the other at the end of the writing-line for a change of carriage travel, means controlled at each end of the carriage for actuating the said reinforcing means to effect the said transfer of motors, and means for effecting the transfer and the direction of the carriage travel independent thereof.

28. In a type-writing machine, a traveling carriage and platen, an escapement device, of a carriage lateral driving mechanism comprising a motor associated with its complement of gearing for power and speed ratios for moving the carriage in one direction, a motor coupled to power and speed changing devices for driving the carriage in an opposite direction, shifting gearing adapted to connect with the motor-gearing to alter the power and speed thereof for each direction of the motor effort, means for absorbing power in the carriage non-driving motor to actuate thereof for subsequent stroke, automatic means controlled at the ends of the carriage for effecting the change in the motors for a difference of travel and power, and means controlled independently of the carriage for changing the said motors and the direction of the carriage movement.

29. In a type-writing machine, of a carriage and platen therefor, lateral duplex driving means for the carriage comprising, a series of variable speed and power motors, one of the motors adapted to drive the carriage in one direction and store energy in a reverse direction into the other for a subsequent carriage movement, a series of speed and power multiplying means between the motors, means controlled by the carriage during its movements and at the ends of its stroke for inserting alternate power and speed-governing means in operative connection with the said multiplying means to transfer the carriage from one motor effect to the other, uncoupling means for operating one motor, and means independent of the carriage for varying the power of the motors and the direction of carriage movement.

30. In a type-writing machine, a laterally-movable carriage therefor, an escapement device, of a carriage-driving mechanism comprising a motor for actuating the carriage in a direction controlled by the escapement device, a motor for driving the carriage in an opposite direction out of control of the said escapement device, power and speed changing means connected to the motors for periodic reversals of power thereof, alternately-shiftable means for interposing additions to the said power and speed changing means, means controlled by the said shiftable means for operating one motor to drive the carriage and store energy into the other for a subsequent reverse direction, means traversing the carriage and around the ends thereof at the ends of its stroke for controlling the shiftable means and the carriage-traveling direction, and means for operating the shiftable means independent of the carriage.

31. In a type-writing machine, a traveling carriage and platen therefor, an escapement device, of a carriage-driving mechanism comprising a series of rotary motors, one of the said motors adapted to drive the carriage in a direction controlled by the escapement device, a motor adapted to drive the carriage in an opposite direction unrestricted by the escapement, power and speed changing gearing between the motors, belt-driving means attached to the carriage and actuated by the motors through the said gearing, a series of alternately-shiftable connecting-gearing for effecting the power of the motors, means controlled from the carriage for operating the said shiftable gearing, means controlled by the said gearing to operate both motors for a right and left hand travel of the carriage, means for increasing power to store surplus energy of one motor into the other for driving the carriage for future activity of the motors for driving the carriage in both directions, means for reversing the power of each motor for a change of strength for either direction of the carriage travel, and means for changing the motors and operating the carriage in two opposite directions independent thereof.

32. In a type-writing machine, a traveling carriage and platen therefor, an escapement device, of a carriage-driving mechanism comprising a minimum-powered motor for driving the carriage in a direction controlled for intermittent lateral motion by the escapement device, a maximum-powered motor for returning the carriage to the initial point after the termination of its intermittent movement, a drum or pulley having attachment means to the carriage and actuated in opposite directions by both of the said motors, a series of gear-wheels in variable connection with the minimum-powered motor, a series of communicating gearing in coacting relation with the maximum-powered motor, means for causing the said motors to be disconnected when out of effective driving relation with the carriage, a series of power-altering shiftable means controlled beneath the carriage and at the end thereof for coupling the motors together for a right and left hand movement, means for automatically and non-automatically increasing and decreasing the ratio of speed and power between the motors, alternate power-coupling means for driving one motor by the surplus energy of the other during a carriage-drive, and means independent of the carriage for producing changes of power and speed in the motors and the direction of travel of the carriage.

33. In a type-writing machine, a traveling carriage, an escapement device of a carriage right and left hand driving means comprising a motor adapted to drive the carriage in a direction controlled by the escapement device, a motor adapted to drive the carriage unrestricted in a reverse direction, a series of gear-wheels arranged for variable power rotation in one direction, means controlled by the said gear-wheels for increasing the speed when rotated in an opposite direction, a belt-drum arranged for connection to the carriage and actuated by the said motors and gear-wheels, a series of periodically-acting rotary coupling means insertible into the said gear-wheels, means controlled beneath the carriage and at the ends thereof for alternating attaching and detaching the coupling means to alter the carriage direction of movement, means controlled by the carriage and the said coupling means for storing surplus energy of one motor into the other for driving the carriage in a right and left hand direction, and means for actuating the said periodic coupling means independently of the carriage.

34. In a type-writing machine, a carriage therefor, an escapement device, a carriage-driving mechanism comprising a motor adapted to intermittently drive the carriage in one direction and controlled by the escapement device, a motor arranged to drive the carriage in an opposite direction continuously to the end of its return stroke, stationary and movable gearing interposed between the motors for varying the power and speed thereof, means controlled by the said movable gearing for storing surplus energy into one motor for a subsequent carriage movement as the other actuates the carriage in an opposite direction, means transversely and longitudinally traversing the carriage to effect a transfer of motors at the end of the carriage-stroke, and controlling means independent of the said traversing means for effecting a change in the carriage direction and the power of the motors.

35. In a type-writing machine, a carriage, an escapement device, of a carriage-driving means comprising a motor adapted to drive the carriage step by step when controlled by the escapement device, a motor powered for maximum effect for driving the carriage in an opposite direction, a series of stationary and alternately-shiftable governing means between the motors for changing the power and speed of the said governing means, longitudinal and transverse means controlled by the carriage for operating the shiftable means at the ends of the carriage-stroke, means controlled by the said shiftable means for storing increased power in a lesser-powered motor during the action of driving the carriage, means for storing energy in a greater-powered motor during a reverse drive of the carriage, and means for actuating the shiftable means and controlling the carriage and the power of the motors independent of the said carriage.

36. In a type-writing machine, a carriage therefor, of a carriage-driving mechanism comprising a series of motors powered by reactionary effect upon each other for driving the carriage in sundry transverse directions, a series of power and speed increasing means between the motors, longitudinal means upon the carriage for holding the motors alternately into action for driving the carriage, transversely-reciprocating means upon the said carriage at or near the ends thereof for controlling the alternate motor effect for actuating the said carriage in a transverse direction, and means for actuating the said reciprocating means for driving the carriage independent of the said longitudinal and transverse means.

37. In a type-writing machine, of a movable carriage therefor, of a transverse carriage-driving mechanism comprising a series of motors capable of receiving and expending energy for a duplex carriage-drive, a series of disconnected power and speed multiplying means between the motors, automatic means carried by the carriage and actuated thereby at the ends of its stroke for alternately shifting the effect of the motors in connection with the said speed and power multiplying means and the automatic means for a right and left hand movement of the carriage, and a slidable connection for operating the said shifting of the motors and the direction of the carriage independent thereof.

38. In a type-writing machine, a movable carriage therefor, of a carriage-driving mechanism comprising a series of variable-power motors adapted for variable power and speed connections, a series of gearing forming the said power and speed connections, a series of shifting-gear elements adapted to reinforce the power and speed of the said motor connections, means comprising the said power and speed connecting-gearing and the shifting gearing for absorbing power in one motor when doing work to store energy in the other for subsequent carriage-drive, means coacting with the carriage and traversing a path approximating an elongated rectangle for alternately shifting the motors for a duplex transverse carriage-stroke, means for actuating the said shifting gearing by the said means actuated by the carriage, and means for changing the power of the motors and the direction of carriage travel independent of the said means traversing a rectangular-shaped path.

39. In a type-writing machine, a carriage, an operating-keyboard, a carriage-driving means comprising a series of variable speed and power motors for driving the carriage in two transverse directions, a plurality of gear-wheels forming power and speed ratio changing means for the motors, a series of alternately-shiftable gear-wheels for connecting the said gear-wheels for storing energy into one motor while the other drives the carriage in one direction, means for utilizing the spent energy stored into one motor by the other for a subsequent carriage movement in an opposite direction, automatic means controlled by the moving carriage to actuate the shifting means and the power of the motors near the ends of the carriage-stroke and means controlled from the keyboard for effecting a change of the said shifting gear-wheels to control the motors independent of the carriage.

40. In a type-writing machine, of a carriage and platen, an operating-keyboard, a series of variously-powered motors for driving the carriage in a right and left transverse direction, a plurality of gear-wheels connected for power and speed when oppositely operated, a series of alternately-shiftable reinforcing means for the said gear-wheels, a crossover-roller normally in contact with the carriage and actuating the connecting means for the shiftable reinforcing means when the carriage reaches the ends of its stroke in moving in a right and left hand direction, horizontal means carried by the carriage for holding the said crossover-roller in one position during the effort produced by one motor, means for shifting the roller to hold another motor in connection for an opposite drive of the carriage when the said carriage reaches the end of its stroke in either direction, and means for operating the said crossover-roller from the keyboard independent of the carriage.

41. In a type-writing machine, a movable carriage and platen therefor, a carriage-supporting base member, of an automatic and non-automatic carriage-driving means comprising a series of multidirectional motors for driving the carriage in a right and left hand transverse path, a series of power and speed changing gearing alternately disconnected from one of the motors, a series of pairs of concentric gear-wheels having different diameters, means for reinforcing power at intervals into the said gearing by the shiftable concentric gear-wheels, a bar horizontally disposed upon the carriage or its base and actuated therewith, a roller adapted to traverse the said bar during the movement of the carriage, means for causing the said roller to cross over alternately from one side to the other of the said bar to hold one motor at a time in action for driving the carriage, means for causing the roller to cross over on each side of the bar at the ends thereof for a change of motors and direction of carriage movement, means for causing the said roller to describe a path corresponding to the shape of the bar, and means independent of the said roller and bar for shifting the motors to alter the carriage transverse direction and the power and speed of the motors.

42. In a type-writing machine, a movable carriage and platen, an operating-keyboard, an escapement device, of a carriage-driving means comprising a series of motors operating by action and reaction for driving the carriage in a right and left hand direction, a series of variously-powered gearing in alternate connection with the motors for power and speed, a plurality of pairs of shiftable concentric gear-wheels of different diameters for reinforcing the said gearing for changes in power and speed, automatic and non-automatic means for causing connection between the said gearing and the reinforcing gear-wheels, a curved-ended bar upon the carriage and traveling therewith, means for adapting the length of the said bar to correspond to the length of the writing-line, a roller supported for transverse reciprocation around the said bar at intervals and controlling the said shiftable gear-wheels, means for causing the roller to traverse one side of the said bar when the carriage moves in a direction controlled by the escapement, means for effecting a cross over of the roller to the opposite side of the bar around the ends thereof when the carriage is moved to the end of its stroke for return direction thereof, and means for operating the said shiftable gear-wheels from the keyboard.

43. In a type-writing machine, of a movable carriage and platen therefor, an escapement device, of a carriage-driving mechanism comprising a series of motors for driving the carriage in two transverse directions, a plurality of gearing between the said motors for power and speed multiplying ratios, a plurality of pairs of alternately-shiftable concentric gear-wheels having different diameters for reinforcing and varying the ratio of the said power and speed of the said gearing for driving the carriage in a right and left hand direction, means controlled by the said shiftable gearing for storing power in one motor for a subsequent action by the operation of the other in driving the carriage in an opposite direction, a curved-ended bar located upon and traveling with the carriage, the said bar being of a length to correspond to the length of the writing-line, a reciprocating roller adapted to have a direction of movement at right angles to the longitudinal axis of the bar, means for coöperatively connecting the said roller to the shiftable gear-wheels, means for causing the said roller to traverse both sides of the bar when the carriage is moving in a right and left hand direction, means for causing the roller to pass around the ends of the bar to the opposite side thereof for shifting one motor connection to the other, means for causing the said roller to assume a path approximating an elongated rectangle, means for curving the ends of the bar to facilitate the passage of the roller around thereof at the ends of the carriage-stroke, means for holding the active motor into connection with the carriage by the roller when in contact with the said bar, and means for actuating the shifting gear-wheels independent of the said bar and the roller.

44. In a type-writing machine, a carriage and platen, an escapement device, a series of key-levers, of a transverse carriage-actuating mechanism comprising a series of motors adapted for right and left hand rotation, means for causing an intermittent rotation to one motor and continuous unrestricted motion to the other for opposite directions of the carriage travel to return the same to the starting-point of the intermittent movement, a plurality of multiplying and compensating means between the motors, a series of pairs of concentric gear-wheels for reinforcing the power and speed of the multiplying means and alternately shiftable in and out of contact therewith, a bar pointed at both ends attached to the carriage and traveling therewith and having a length equal to that of the writing-line, a reciprocating roller adapted to alternately engage each side of the bar before the carriage reaches the ends of its stroke in both directions, means for causing the roller to pass around the pointed ends of the bar to operate the shiftable gear-wheels for controlling the carriage-moving direction, a rack-ended bar forming connecting means for the roller to the concentric gear-wheels, and key-lever-controlled means for operating the said shifting gear-wheels independent of the said bar and roller.

45. In a type-writing machine, a movable carriage and platen, a series of character-printing and special-key levers, a space-bar, an escapement device, of a carriage duplex transverse driving means comprising a series of oppositely-rotating motors for driving the carriage intermittently and continuously in opposite directions, power and speed changing means connected therewith, a rockably-supported series of pairs of concentric and abutting gear-wheels, means for alternately and automatically coupling the said rockably-supported gear-wheels with the said intermittent and continuous power and speed changing means, a depending bar on the carriage and moving therewith, the said bar having curved ends thereon, a reciprocating roller for engaging the bar upon each side thereof as the carriage travels a right and left hand direction, a slidably-jointed rack-ended bar carrying the said roller, a connecting segmental gear-wheel meshing with the said rack and controlling the reciprocating motion of the roller, means controlled by the carriage for actuating the said segmental gear and transmitting the movement to the concentric gear-wheels and the motors, key-lever and space-bar means for actuating the segmental gear, and means independent of the said roller and segmental gear-wheel for changing the shifting pairs of gear-wheels and the direction of the carriage movement.

46. In a type-writing machine, a traveling carriage and platen, a series of key-levers, an escapement device of a carriage-driving mechanism comprising a plurality of oppositely-rotating motors for actuating the carriage in two transverse directions, a series of power and speed changing means normally connected thereto, a rockably-supported series of concentric gear-wheels for coupling additional power to the said power and speed changing means, a depending curved-ended bar supported by and moving with the carriage, a roller adapted for transverse reciprocation across and traversing the bar when the carriage is in action, means for causing the roller to cross from one side to the other of the bar at its curved ends when the carriage is at the end of its stroke, for actuating the said rockable concentric gear-wheels and changing the motors, a rack-ended bar in coacting relation with the rockable gear-wheels and the roller, resilient means attached to one of the key-levers for actuating thereof while the roller is in contact with the said bar, and independent key-lever means for actuating the roller transverse to the said bar while in contact therewith for shifting each of the said motors alternately in connection with the carriage.

47. In a type-writing machine, a traveling carriage and platen, a plurality of key-levers, an escapement device, of a carriage-driving mechanism comprising a series of oppositely-rotating motors for actuating the carriage, a series of gear-wheels periodically disconnected for maximum-power effect, a series of concentric gear-wheels having different diameters for alternately connecting the said series of periodically-disconnected gear-wheels, an elongated bar attached to and movable with the carriage and having pointed ends thereon, a series of rockable supports for the said concentric gear-wheels, a plurality of vertically-disposed bell-cranks pivotally connecting means from the said bell-crank and the rockable supports, a rack-ended rod pivotally connected to the bell-crank at one end, means controlled by one of the key-levers for lengthening and shortening the said rod, a roller on one end of the said rod, means controlled by the elongated bar upon the carriage, a key-lever-actuated resilient connected segmental gear-wheel meshing in the rack end of the said rod, means for automatically connecting each motor alternately to the carriage by the roller and rack-ended bar, and means for non-automatically effecting the change of motors and the power thereof by the said key-lever means actuating the rod.

48. In a type-writing machine, a movable carriage, and platen, an escapement device, a series of key-lever and spacing bars, of a carriage-driving mechanism comprising a plurality of alternately-shiftable motors for actuating the carriage in two directions, connecting-gearing between the motors, a series of concentric gearing periodically connected to the said connecting-gearing between the motors, means for furnishing a reinforcement of power thereto by the said periodically-connected gearing, a plurality of rockable spring-pressed vertical supports for the said concentric gearing, a bell-crank having a series of axially-separated arms thereon, one of the said arms connected to the rockable supports, a rod connected to one of the bell-crank arms adapted for linear movement, a series of supports for slidably holding the said rod, a spring-controlled sliding joint in the rod adapted to cause the rod to be lengthened or shortened, a bell-crank adapted to operate the said joint by one of the key-levers, a toothed end on the said rod, a roller upon the said toothed end, a key-lever and space-bar actuated segmental gear-wheel meshing with the said toothed end of the bar, a rod resiliently connected to the space-bar for actuating the segment-gear, means for actuating the space-bar for shifting the motors non-automatically at the end of the writing-line, and means for shifting the said motors at any point of the carriage-stroke by the said sliding joint in the tooth-ended rod.

49. In a type-writing machine, a movable carriage and platen, a series of type-actuating and special-key levers, a series of motors for driving the carriage, gear-wheel connecting means between the motors, a series of power-reinforcing alternately-shiftable concentric gear-wheels, a bar attached to and movable with the carriage having curved or pointed ends thereon, a roller adapted to traverse the said bar for holding one motor at a time in connection with the carriage, means for passing the roller around the ends of the bar at the end of the writing-line, a divided bar having a rack end thereon, slip-joint means at the divided portion of the bar to admit of its being extended or shortened, a bell-crank connected to the said bar to actuate thereof by one of the key-levers, a segmental gear-wheel operated by the said rack end, a series of bell-cranks connecting the said rack-ended bar with the alternately-shiftable connecting gear-wheels, means for actuating the said rack-ended bar independent of the segmental gear-wheel, resilient means connected to a key-lever and the said segmental gear-wheel for operating thereof without actuating and a divided rod and having a partly-inclosed spring between a series of plates forming the said resilient connection between the segmental gear-wheel and the said key-levers.

50. In a type-writing machine, a carriage and platen, a series of key-levers, a series of shiftable power-connecting motors for driving the carriage in opposite directions comprising an elongated bar under the carriage having curved ends thereon, a rack-ended rod slidably mounted in the vicinity thereof, a roller adapted to engage the said bar upon its sides before the ends of the carriage-stroke, means for causing the roller to pass around the curved ends of the bar at the conclusion of the writing-line, a sliding spring-controlled joint in the said rod, means for causing the rod to be lengthened and shortened by the said joint, a series of bell-cranks pivotally connected to the said shiftable connection of the motors to drive the carriage by one motor at a time, a segmental gear-wheel adapted to be actuated by the rod and the roller, means for actuating the said toothed or rack-ended bar and the segmental gear-wheel by one of the key-levers, spring compression and extension means for preventing motion to be imparted to the key-lever or space-bar when the segmental gear-wheel is operated automatically and non-automatically, means for operating the said shiftable connecting means without actuating the said roller and the segmental gear to change the motors, and means for preventing the carriage from returning to the initial writing-point during the writing of a word or until the writing-line has reached the given minimum length.

51. In a type-writing machine, a carriage and platen, a series of key-levers, of a carriage driving and governing means comprising a series of motors adapted for right and left hand rotation, a series of gear-wheels connected to one motor, a series of shiftable gear-wheels for alternately connecting the other motor with the gear-connected motor, a pointed-end bar attached to and movable with the carriage, a plurality of bell-cranks connected to the said shiftable gear-wheels, a slidably-mounted jointed rod connected to the said bell-cranks, means for causing the said rod to be extended by means of the said joint, a rack at one end of the slidably-mounted bar, a roller upon the rack end adapted to traverse one side of the pointed-end bar when the carriage is moving in one direction, means for automatically causing the roller to pass around the other end of the bar to the opposite side when the carriage is moving in the reverse direction, a segmental gear-wheel meshing with the rack end of the slidable rod, an arm on the said segmental gear-wheel, a rod connecting thereof to the space-bar, a spring between the rod and the said space-bar, means for operating the space-bar without disengaging the roller from the pointed-end bar, means for operating the said roller without actuating the segmental gear, and means controlled by the said joint in the slidable rod for key-lever actuating the said shiftable gear-wheels.

52. In a type-writing machine, a carriage therefor, a series of key-levers and space-bars, a carriage-driving means comprising a plurality of rotary motors for driving the carriage in opposite directions, a series of power-multiplying means between the motors, a series of alternately-connecting gear-wheels for reinforcing the power of the said multiplying means, a bar beneath the carriage and actuated thereby, the said bar having an elongated shape with pointed ends, means for gaging the length of the writing-line by the length of the said bar, a rack-ended rod having a slip-joint therein, a roller upon the said rack, a segmental gear-wheel meshing in the said rack, a resilient connection from one of the space-bar levers to the said segmental gear-wheel, a plurality of bell-cranks connected to the said alternately-connected reinforcing gear-wheels, means for causing the said roller to describe a path approximating the shape of the said bar under the carriage for actuating the said reinforcing gear-wheels to change the power means between the motors, means for operating the segmental gear-wheel and the roller upon the rack by the space-bar when the roller is disengaged from the bar under the carriage, means for actuating the segmental gear-wheel automatically at the end of the writing-line, and means controlled by the said slip-joint for actuating the said reinforcing gear-wheels to change each motor effort upon the carriage independent of the said roller and segmental gear-wheel.

53. In a type-writing machine, a laterally-movable carriage and platen, a series of key-levers and space-bars, of a carriage-driving means comprising a series of oppositely-rotating gear-wheel-carrying motors having maximum and minimum powers a belt drum or pulley, a drum-shaft, a series of connecting gear-wheels between the maximum-powered motor in decreasing power ratio consisting of a pinion or wheel on the drum-shaft meshing with the maximum-powered motor-wheel, a larger wheel concentric with the pinion or wheel, a smaller wheel concentric therewith, an idle wheel meshing with the smaller wheel, a shaft parallel with the drum-shaft connected to the minimum-powered motor, a series of separated concentric pinions thereon disconnected from the described train of gearing, a rockably-supported set of gear-wheels for coupling the motors together, one member of the set of rockable gear-wheels meshing with the large wheel on the drum-shaft, in connection with the maximum motor, the other member of the set meshing with one of the pinions on the minimum-motor shaft one member of a second set of rockably-supported concentric wheels meshing with the other pinion on the minimum-motor shaft, the other member thereof meshing with the idle wheel forming a train of communicating gearing to the maximum-powered motor for an increased power ratio, a series of carriage and key-lever-controlled bell-cranks for actuating the said rockably-mounted sets of wheels, and means for regulating the power and speed ratios of the said train of gearing by the rockable gearing to store surplus energy during the rotation of one motor into the other for its subsequent action.

54. In a type-writing machine, a carriage and platen, a series of key-levers, of a transverse carriage mechanism comprising, a belt-drum, a maximum-powered motor adapted to rotate to the right, a train of gear-wheels adapted to supply decreasing ratios of power when rotated in one direction, the said train of gearing consisting of a large gear-wheel on the said motor, a pinion on the belt-drum shaft meshing therewith, a larger wheel concentric with the pinion, a smaller wheel concentric therewith, an idle wheel meshing with the said smaller wheel, a periodically-disconnected minimum-powered motor, a shaft therefor, a series of concentric adjacent pinions thereon disconnected from the described train of gearing, a plurality of sets of alternately-connected gear-wheels having different diameters, one of the sets thereof adapted to connect the maximum-powered motor with the minimum-powered motor for maximum effect to drive the carriage when the minimum-power motor is rotated to the left, means for reducing the power when the maximum-powered motor is rotating to the right to store energy therein, means for actuating the said alternately-connected sets of gear-wheels by the carriage and independent thereof, and means for varying the diameters of the said sets of wheels and described train of gearing to correspond to the energy capable of being expended by each motor.

55. In a type-writing machine, a carriage and platen, a series of key-levers, of a lateral carriage-driving mechanism comprising a belt-drum, a series of belts attached thereto and the carriage at each end thereof, a drum-shaft, a maximum-powered motor for directly actuating the drum, a disconnected minimum-powered motor adapted to rotate the drum in an opposite direction when coupled thereto, a series of gearing acting to diminish power when the maximum-powered motor is rotated, a series of coupling concentric gear-wheels controlled by the carriage for increasing power when the minimum-powered motor actuates the described gearing, means for actuating one motor by the other for a subsequent action thereof, carriage-controlled means for alternately shifting the motors from one to the other as the carriage reaches the end of its stroke in both directions, and means for effecting the said change of motors and the power thereof by one of the key-levers independent of the carriage.

56. In a type-writing machine, a carriage and platen, a series of key-levers, an escapement device, of a lateral carriage-driving means comprising a right and left rotating drum or pulley, a gear-wheel thereon, a rack meshing therewith and attached to the carriage, a maximum-powered motor for driving the drum in one direction, decreasing power-gearing for operating the said drum and the carriage when the maximum-powered motor is rotating, a maximum-powered motor actuating the drum and carriage in a reverse direction of rotation, a series of gear-wheels disconnected from the maximum-powered motor, means controlled by the carriage for interposing movable gearing for connecting the maximum-powered motor, means for increasing power from the minimum-powered motor to store surplus energy thereof to the maximum-powered motor, means for shifting one motor to the other as the carriage reaches the ends of its stroke, and means for effecting the shifting of the motors by the carriage and independent thereof.

57. In a type-writing machine, a carriage, rotary carriage-supporting means comprising a series of depending lugs on the carriage, a series of axles having a bevel-faced enlargement on one end thereof, nut-adjustment means for the said axles, a slidably-mounted bevel-faced sleeve on each axle, said sleeve having a cone end adapted to form a ball-holding angular cavity with said beveled-faced enlargement, a series of lenticular-shaped grooved wheels, and a plurality of balls in the said grooves in the wheels.

58. In a type-writing machine, and its frame, a carriage, a series of rollers or wheels, a series of tracks for passage of the rollers to move the carriage, a convex flange on the said track, means for embedding the tracks partly into the frame of the machine, and means for compensating for expansion between the said tracks and the frame.

59. In a type-writing machine, a carriage and its frame, a series of rollers or wheels therefor, a carriage track or runways consisting of a non-metallic substance, means for mortising the track into the frame, and a compressible material at the contact-points of the frame and the said track and rollways.

60. In a type-writing machine, a carriage, a series of wheels thereon, of a glass track therefor, means for allowing for expansion thereof when surrounded by metal, and a guard-plate extending partly upon the plane of the said tracks.

61. In a type-writing machine, a carriage, a series of roller-supports therefor, a track or runways for the rollers, a sloping-face bead or flange thereon, and antifriction means for allowing for the side thrust of the rollers upon the bead or flange.

62. In a type-writing machine, a carriage, a series of rollers or wheels, tracks or rollways for the wheels, a flange thereon, and a roller upon the flange having its axis at right angles to the said carriage-wheels for receiving the side thrust thereof.

63. In a type-writing machine, a series of wheels and their axles upon each end of the carriage, a flanged track or runway for the carriage-wheels, a series of adjustable slotted blocks upon or adjacent to the said flange, a series of rollers supported in the said blocks, a series of depending angle-ended brackets secured to one end of the axles, a series of narrow plates attached to the brackets and extending from axle to axle in the direction of the carriage length, means for causing the plates to pass the rollers when the carriage is moving for taking up the thrust thereof, and means for causing the narrow plate to have a variable pressure against the rollers.

64. In a type-writing machine, a carriage, a platen-roll movable therewith a right and left hand transverse driving means for the carriage, an escapement device for controlling the carriage for a step-by-step motion in one direction of movement thereof, unrestricted moving means for the carriage in an opposite direction a slotted bar on the end of the carriage, a correspondingly-extensible rack slidably connected thereon, an adjusting-screw joining the said bar and the rack in for adjusting the rack, a gear-wheel meshing with the said rack, a ratchet-wheel concentric therewith, pawl-controlling means for the ratchet-wheel, a shaft for the gear and ratchet wheels, a series of vanes or paddles radially extending therefrom, a case or cylinder for inclosing the vanes, a viscous fluid in the said case for submerging or partly submerging the vanes, means for rotating the vanes in the fluid when the carriage returns from the end of the writing-line to the initial point thereof to cushion the impact caused by the stoppage of the carriage, means for preventing rotation of the vanes when the carriage is moving toward the end of the writing-line from the initial point thereof, and means for causing the rotation of the vanes in either direction of the carriage movement.

In testimony whereof I have hereunto affixed my signature, in the presence of two witnesses, this 20th day of February, 1905.

ROBERT EUGENE TURNER.

Witnesses:
R. E. TURNER,
HENRY L. MYERS.